United States Patent [19]

Hasegawa

[11] Patent Number: 4,553,180
[45] Date of Patent: Nov. 12, 1985

[54] RECORDING START POSITION SETTING DEVICE FOR USE IN A TAPE RECORDER

[75] Inventor: Tsunao Hasegawa, Saitama, Japan

[73] Assignee: Pioneer Electronic Corporation, Tokyo, Japan

[21] Appl. No.: 646,491

[22] Filed: Sep. 4, 1984

Related U.S. Application Data

[63] Continuation of Ser. No. 347,856, Feb. 11, 1982, abandoned.

[30] Foreign Application Priority Data

Feb. 12, 1981 [JP] Japan .................................. 56-19331
Feb. 16, 1981 [JP] Japan .................................. 56-21011

[51] Int. Cl.[4] .................................................. G11B 15/00
[52] U.S. Cl. .................................. 360/74.4; 360/72.1; 360/74.1
[58] Field of Search .................... 360/72.1, 74.4, 74.5, 360/74.6

[56] References Cited

U.S. PATENT DOCUMENTS 3,140,359 7/1964 Rupard ................................ 360/74.6
3,925,817 12/1975 Althuber et al. ................... 360/74.6
4,228,471 10/1980 Shiga .................................... 360/73
4,380,031 4/1983 d'Alayer de Costemore d'Arc .................................. 360/74.1
4,418,367 11/1983 Nagai et al. .......................... 360/75

FOREIGN PATENT DOCUMENTS 2363570 6/1975 Fed. Rep. of Germany ..... 360/74.4
57-113439 7/1982 Japan .................................. 360/72.3
57-143773 9/1982 Japan .................................. 360/71
57-143774 9/1982 Japan .................................. 360/71
57-147176 9/1982 Japan .................................. 360/90

Primary Examiner—George G. Stellar
Attorney, Agent, or Firm—Sughrue, Mion, Zinn, Macpeak & Seas

[57] ABSTRACT

A device for setting the start position for recording on a magnetic tape includes a leader tape detector, a signal detector for determining whether or not a prerecorded signal exists on the tape, and mechanisms for setting the recording start location at a position following the prerecorded data by a predetermined amount. The device also functions to automatically set the recording start position at a correct position on the reverse side of the tape if it is determined that the originally scanned side is fall.

2 Claims, 13 Drawing Figures

FIG. 6
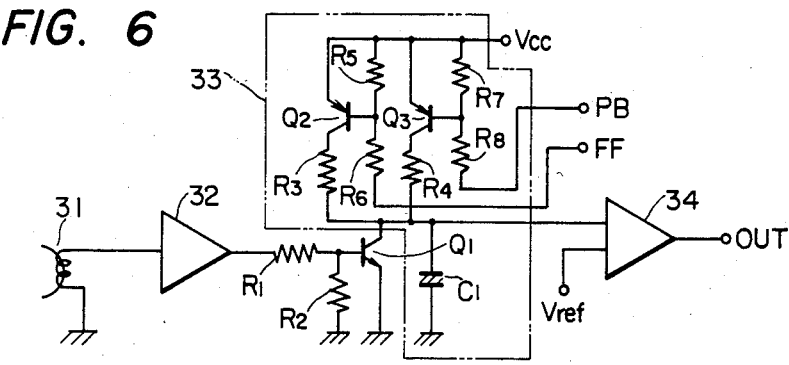
FIG. 7
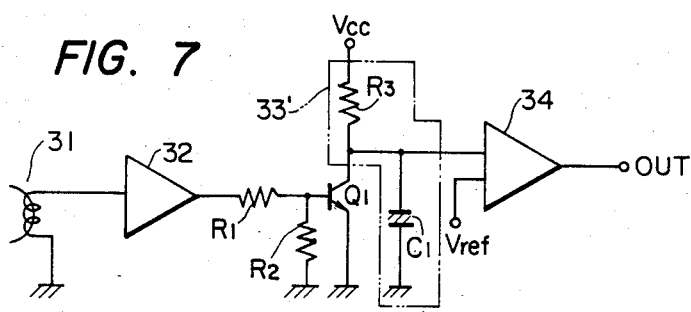
FIG. 8A
FIG. 8B
FIG. 8C
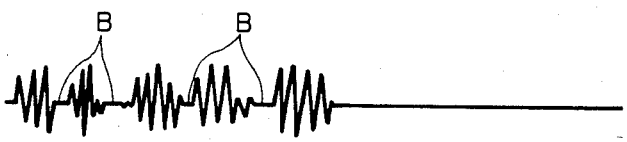
FIG. 8D

RECORDING START POSITION SETTING DEVICE FOR USE IN A TAPE RECORDER

This application is a continuation of application Ser. No. 347,856, filed Feb. 11, 1982, now abandoned.

BACKGROUND OF THE INVENTION

The present invention relates to a recording start position setting device for use with tape recording apparatus.

A recording start position setting device has been proposed in which a recording start position is automatically determined in such a manner, that, upon detecting the trailing edge of a recorded segment on a magnetic tape, or the starting edge of a non-recorded segment, a cue operation is implemented for a predetermined period of time, and thereafter a halt instruction is issued to halt the control operation. Thus, a blank or inter-music portion is formed following a previously recorded segment, or the recording start position is set not on the leader tape, but on the magnetic tape. However, this prior art device involves drawbacks, for example, the length of the blank or inter-music portion is not constant because the tape running speed during the cue operation varies depending upon the radius of the tape being wound. Furthermore, since the length of the leader tape is not constant, it has been necessary to preset the time for continuing the cue operation to longer than the time actually needed, in order to ensure the setting of the recording start position on the magnetic tape portion. As a result, the portion of unused magnetic tape becomes considerably long.

Furthermore, when the above-described prior art device has been used in a tape recorder capable of performing bidirectional recording and playback, it has been necessary if a non-recorded portion does not exist on the track on which the recording start position is intended to be set, to once again instruct the device to implement the recording start position setting operation after switching the operational mode of the tape recorder from a forward directional mode to a reverse directional mode, or vice versa. Such an operational procedure is complicated and troublesome. It is preferred that recording start position setting be quickly and surely carried out.

SUMMARY OF THE INVENTION

Accordingly, an object of the invention is to provide a recording start position setting device for use in a tape recorder, in which the recording start position is set so that an inter-music portion or a blank portion of constant duration is established between the start position and previously recorded data.

Another object of the invention is to provide a recording start position setting device for use in a tape recorder, in which the recording start position is set on the magnetic tape region, adjacent the leader tape.

Still another object of the invention is to provide a recording start position setting device for use in a tape recorder capable of performing bidirectional recording and playback, in which the recording start position is set on an opposite directional track in the case where a non-recorded portion does not exist on a track being searched.

Briefly, these and other objects of the invention are accomplished by the provision of a recording start position setting device, which, upon detecting a trailing edge of a recorded portion, issues a play mode instruction for a predetermined period of time and then issues a halt instruction to halt the play mode operation. When the starting edge of a fresh unused magnetic tape is detected, the tape recorder is instructed to implement the play mode operation, and after detection of the trailing edge of the leader tape, the halt instruction is issued, thereby setting the tape in the recording start position. Furthermore, when a non-recorded portion of a predetermined length does not exist on a track of one of the forward or reverse sides, the device is operated to detect a non-recorded portion of a predetermined length on the opposite directional track. After the same is detected, the recording start position is set at a position departing a certain distance from the trailing edge of the previously recorded portion.

BRIEF DESCRIPTION OF THE DRAWINGS

In the drawings;

FIG. 6 is a circuit diagram of a signal detection circuit adapted for use in the recording position setting devices according to both the first and second embodiments of the invention;

FIG. 7 is a circuit diagram of another signal detection circuit adapted for use in the recording position setting device; and FIGS. 8A through 8D are waveform diagrams for describing the operations of the circuit shown in FIG. 7.

DETAILED DESCRIPTION OF THE PREFERRED EMBODIMENTS

Figure 1:
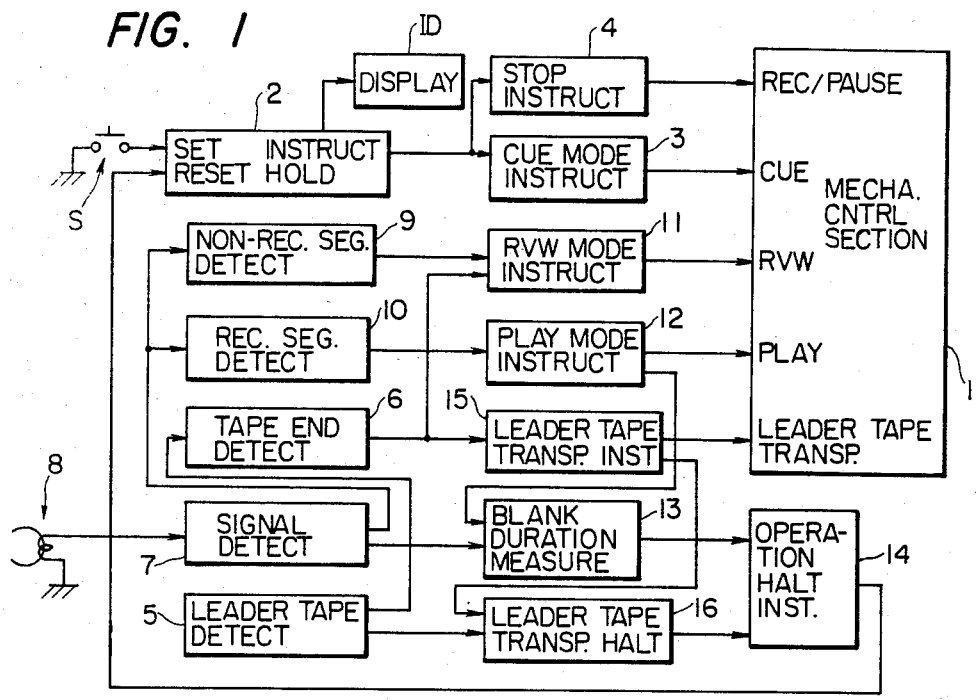
FIG. 1 is a block diagram illustrating a recording position setting device according to a first embodiment of the invention.

FIG. 1 is a block diagram illustrating a recording start position setting device according to one embodiment of the invention. The device as shown is constructed to automatically supply various operational mode instruction signals to a mechanism control section 1 provided in a tape recorder capable of performing cue and review operations. The device operates to stop the movement of the tape so that recordation on a non-recorded blank region of the magnetic tape may be carried out, starting from a position separated by a predetermined length from a previously recorded region. When a non-lock type start switch S is closed, a control start instruction signal, which is a low level pulse, is applied to a set input terminal of an instruction holding circuit 2. The latter circuit includes memory means set in response to the control start instruction signal. An output signal of the circuit 2 indicative of the stored content in the memory means is supplied to a cue mode instruction circuit 3, a stop instruction circuit 4 and a display means ID including display elements. When the memory contained in the instruction holding circuit 2 is set, the cue mode instruction circuit 3 supplies an instruction signal in pulse form to a cue input terminal of the mechanism control section 1, whereby the tape recorder is set to implement the cue operation. Simultaneously, the display means ID is lit, thereby indicating that the control operation is being carried out.

A leader tape detection circuit 5 operates to produce a leader tape detection signal when the leader tape is in a position confronting a recording head. The leader tape detection signal thus produced is supplied to a tape end detection circuit 6. The latter circuit produces an end signal when the reel sprockets stop their rotation during receipt of the leader tape detection signal from the circuit 5. A signal detection circuit 7 operates to produce a pulse train signal having frequencies corresponding to those of audio outputs picked up by a playback head 8.

As long as recorded data is present on the magnetic tape during the cue operation, the pulse train signal is produced from the signal detection circuit 7 and is applied to both a non-recorded (blank) segment detection circuit 9 and a recorded segment detection circuit 10. The cue operation continues, and a non-recorded segment of the magnetic tape is brough into sliding contact with the playback head 8. At this point, the pulse train signal is no longer produced from the signal detection circuit 7. After a first predetermined period of time has passed since the cessation of the pulse train signal, the blank segment detection circuit 9 produces a blank segment detection signal and applies it to a review mode instruction circuit 11. The latter circuit 11 also receives the end signal from the tape end detection circuit 6 and produces an instruction signal which is applied to a review input terminal of the mechanism control section 1 when either the end signal or the blank segment detection signal is received. In response to the instruction signal applied to the review input terminal, the tape recorder is rendered in a review mode.

As a result of the review operation, when the end of the recorded segment on the magnetic tape reaches the position of the playback head 8, the recorded segment detection circuit 10 applies a recorded segment detection signal to a play mode instruction circuit 12 which in turn applies an instruction signal to a play input terminal of the mechanism control section 1 and to a blank duration measuring circuit 13. In consequence, the tape recorder is rendered into the play mode. The blank duration measuring circuit 13 also receives the pulse train signal from the signal detection circuit 7. When the pulse train signal is not supplied, while the instruction signal is fed from the play mode instruction circuit 12, the blank duration measuring circuit 13 produces a blank duration end signal, after the passage of a second predetermined period of time running from the receipt of the instruction signal delivered from the play mode instruction circuit 12. If the pulse train signal is present while the instruction signal is received from the instruction circuit 12, the blank duration end signal is outputted after the second predetermined period of time has passed since the non-occurence of the pulse train signal. The blank duration end signal thus produced is applied to an operation halt instruction circuit 14 which in turn applies a halt instruction pulse to a reset input terminal of the instruction holding circuit 2. In response to the halt instruction pulse, the memory means contained in the holding circuit 2 is rendered reset and the display means ID is turned off. Further, the stop instruction circuit 4 supplies an instruction signal to a REC/-PAUSE input terminal of the mechanism control section 1, whereby the tape recorder is rendered in a recording stand-by condition. In this case, it will be appreciated that the output of the stop instruction circuit 4 may be applied to a stop input terminal (not shown) of the mechanism control section 1 so that the tape recorder is rendered in a stopped condition.

In the case where the magnetic tape is rewound to the start position while the recorded segment is not detected under the review condition, the rotation of the reel sprockets are stopped. Then, the tape end detection circuit 6 supplied the end signal to a leader tape transportation instruction circuit 15. At this time, the latter circuit 15 supplies instruction signals to both the leader tape transportation input terminal of the mechanism control section 1 and a leader tape transportation halt instruction circuit 16.

In the mechanism control section 1, the instruction signal supplied from the instruction circuit 15 and the instruction signal applied to the cue input terminal are subject to logical addition (OR), so that the tape recorder starts the cue operation again. In this case, a modification is possible such that the output of the instruction circuit and the instruction signal applied to the play input terminal are subjected to logical addition. Also applied to the instruction circuit 16 is the leader tape segment detection signal from the circuit 5. The leader tape transportation halt instruction circuit 16 produces a transportation halt signal and applies it to the operation halt instruction circuit 14 when the leader tape detection signal is not supplied after the instruction signal is supplied from the instruction circuit 15. At this time, the operation halt instruction circuit 14 supplies the halt instruction pulse to the reset input terminal of the instruction holding circuit 2, similarly to the case when the blank duration end signal is supplied to the operation halt instruction circuit 14. As a result, the display means ID is turned off and the tape recorder is rendered in the recording stand-by condition.

Figure 2A:
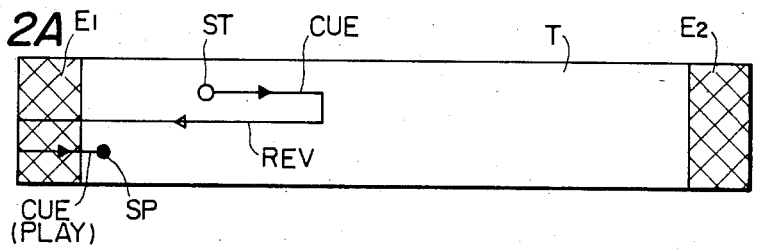
FIGS. 2A through 2C are explanatory diagrams for describing the movement of magnetic tape relative to the head.
Figure 2B:
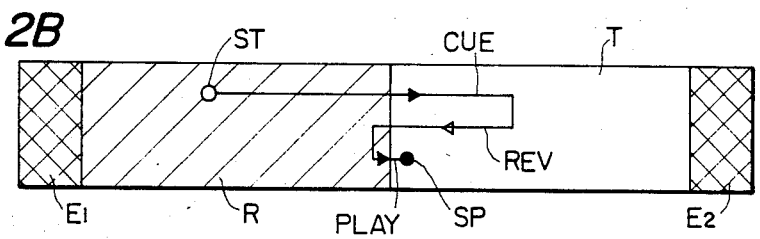
Figure 2C:
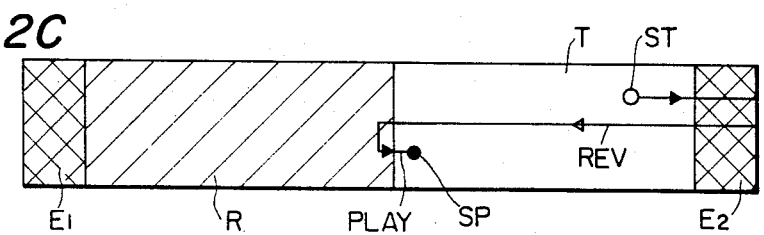

FIGS. 2A through 2C are explanatory diagrams for describing the movement of the magnetic tape relative to the recording/playback head, when controlled by the recording start position setting device in accordance with the invention. It is to be noted that the following description is made as if the recording/playback head moves relative to the magnetic tape, although the contrary is actually the case. In FIG. 2A, there is shown a blank magnetic tape segment T. Assuming that the recording/playback head is initially in the position ST, the head moves towards the leader tape segment $E_2$, in accordance with the cue mode operation, for the first predetermined period of time and thereafter the head returns to the starting edge of the magnetic tape in accordance with the review operation. Next, the recording/playback head moves toward the other edge of the magnetic tape in accordance with either the cue mode operation or the play mode operation. After detecting the end portion of the leader tape segment $E_1$, the recording/playback head stops at the position SP on the magnetic tape T near the end of the leader tape. Then, the tape recorder is placed in the recording stand-by state.

FIG. 2B shows the case where a recorded segment R is present on the magnetic tape T. In this case, when the recording/playback head enters the recorded region during the review mode operation performed after the cue mode operation, the tape recorder is placed in a play condition. After the second predetermined period of time has passed, the movement of the head stops at the position SP and is placed in either the operation halt condition or the recording stand-by condition.

FIG. 2C illustrates the case where a portion R of the magnetic tape T has already been recorded and the recording/playback head is initially positioned in the vicinity of the leader tape segment $E_2$. In this case, the recording/playback head is moved to the end of the tape prior to the lapse of the first predetermined period of time during the cue mode operation, and thereafter the head is moved in the backward direction towards the recorded segment R in the review mode operation.

As described above, in the recording position setting device in accordance with the invention, a blank portion or inter-music portion is formed on the tape from the end of an already recorded area, by performing the play mode operation for a predetermined duration. Moreover, as shown in FIG. 2A, the recording start position is set upon detecting the end portion of the leader tape segment. Therefore, the blank portion or the inter-music portion always has a constant duration and the recording start position is consistently and accurately determined.

In the description relating to FIGS. 2A through 2C, a tape recorder employing a recording/playback head has been described as an example. It will be apparent to a person skilled in the art that the principle and the circuit construction according to the invention are also applicable to a tape recorder in which the recording head and the playback head are separately provided, insofar as the timing of applying various instruction signals are adequately determined by taking into consideration the distance between the recording and playback heads.

Figure 3:
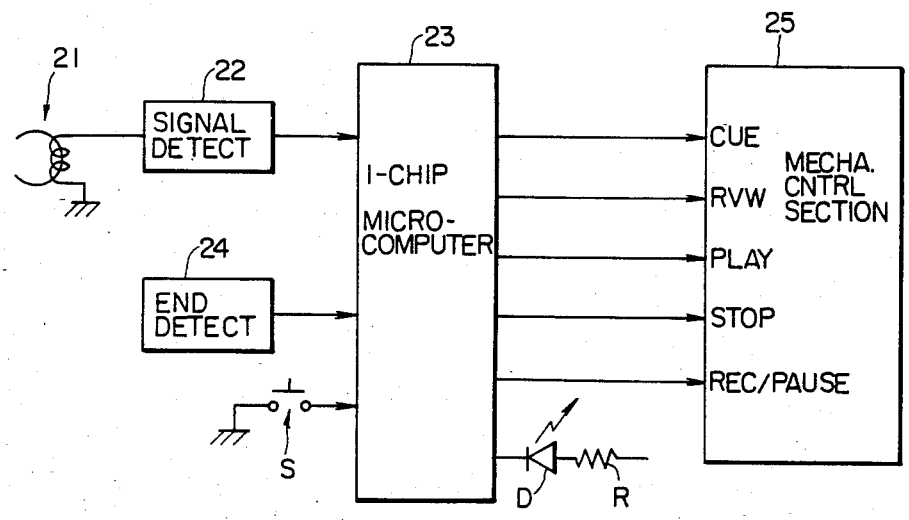
FIG. 3 is a block diagram illustrating a recording position setting device according to the second embodiment of the invention.

FIG. 3 is a block diagram showing a second embodiment of the recording start position setting device, including a microcomputer. In this figure, a playback head 21 picks up recorded data from one of the tracks of either the forward side or the reverse side of the tape and delivers this signal to a signal detection circuit 22. The latter circuit produces a pulse train signal having frequencies corresponding to those of the recorded data. The pulse train signal thus produced is applied to a one-chip micro-computer 23 (hereinafter referred to as a micom) which is an integrated circuit including processors, memories, an interface, etc. To the micom 23 is also applied the output of an end detection circuit 24. The end detection 24 outputs an end signal when the reel sprockets stop their rotations. Upon receiving an operation start signal genarated when a non-lock type switch S is closed, the micom 23 starts its control operation for setting the recording start position by enabling read/write memories and read only memories contained therein. At the start of the operation of the micom 23, a current flows in a light emitting diode (LED) D through a resistor R to light the LED. In response to operational mode instructions fed from the micom 23, a mechanism control section 25 controls mechanical parts (not shown) of the tape recorder so that the tape recorder implements play mode, cue mode, review mode (RVW), and recording stand-by mode (REC/PAUSE) operations.

Figure 4:
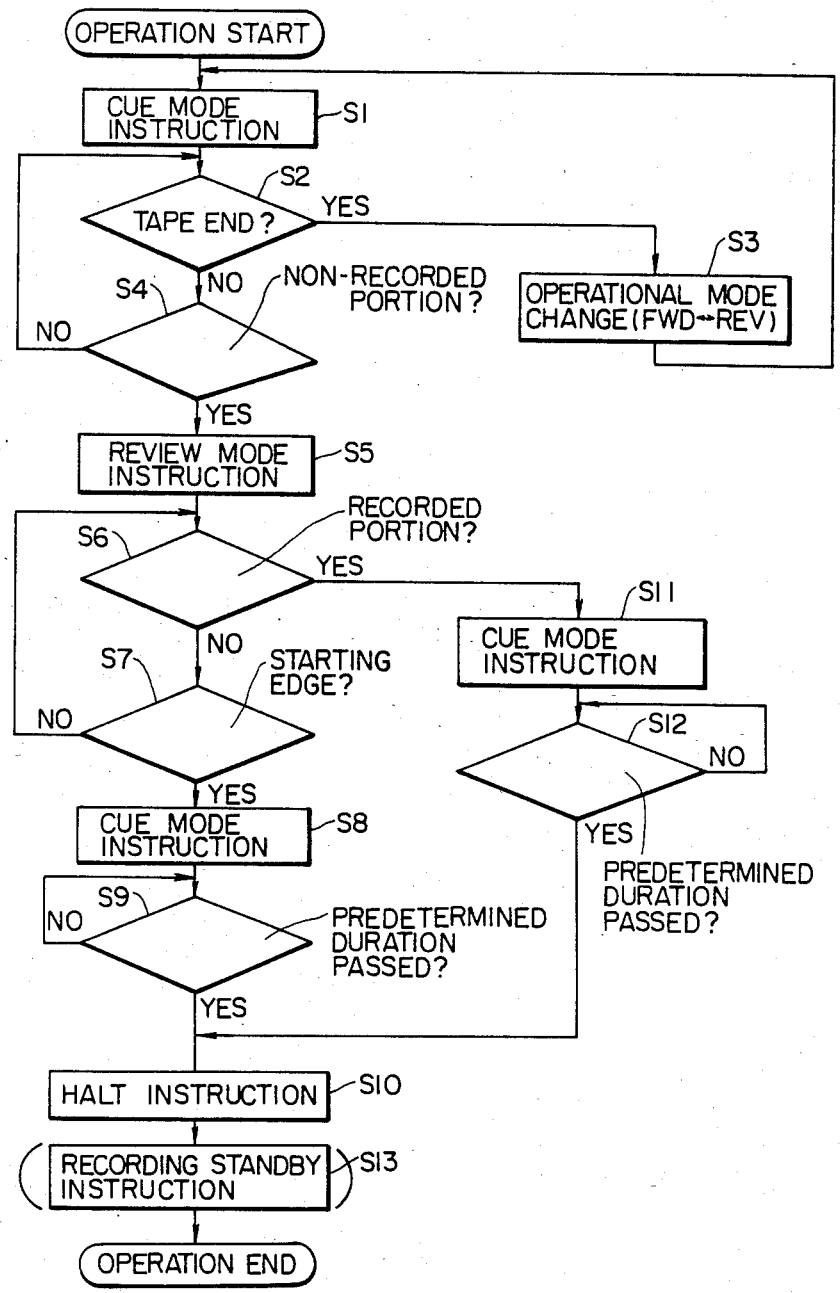
FIG. 4 is a flow chart diagram for describing the operation of the device shown in FIG. 3.

An example of the operational controls executed by the micom 23 will not be described, with reference to the flow chart diagram of FIG. 4.

The microm 23 issues the cue mode instruction to the mechanism control section 25 in response to the operation start signal generated when the switch S is closed ($S_1$). Next, based upon the output of the end detection circuit 24, the micom 23 judges whether or not the end of a track in sliding contact with the recording head reaches the position of the head ($S_2$). If the answer is affirmative (YES), then the micom 23 instructs the control section 25 to change the operational mode from the forward side mode to the reverse side, or vice versa ($S_3$). Then, the control operation is started again from the beginning, i.e. the operation is returned to step $S_1$. If the answer to the judgement question in $S_2$ is negative (NO), i.e. if the end of the tape does not reach the position of the recording head, the microm 23 determines whether or not a pulse train signal is outputted from the signal detection circuit 22 to determine whether or not there exists a non-recorded portion ($S_4$). Specifically, if the pulse train signal occurs for a predetermined period of time, judgement is made that there is no non-recorded portion, and in this case the operation returns to step $S_2$, whereas if the pulse train signal does not occur for a predetermined period of time, judgement if made that there exists a non-recorded portion. In the latter case, the microm 23 issues a review mode instruction ($S_5$) to the mechanism control section 25. The pulse train signal is again detected to judge whether or not there exists a recorded portion ($S_6$). When the recorded portion is not detected, i.e. when the answer is NO, the micorm 23 judges from the output of circuit 24, i.e. the detection of the end signal, whether or not the starting edge of the track has reached the position of the recording head ($S_7$). If the starting edge of the track has not reached the position of the recording head, the operation is returned to $S_6$. When the starting edge of the track reaches the recording head, the cue mode operation is carried out ($S_8$). Next, a predetermined duration of the cue mode operation is monitored ($S_9$). If the predetermined time has passed since the cue mode instruction, then a halt instruction is issued ($S_{10}$). In $S_6$, if a recorded portion is detected, the cue mode instruction is issued ($S_{11}$). Then, it is judged whether a predetermined duration has passed since the issuance of the cue mode instruction ($S_{12}$), and if the answer is YES, the control operation proceeds to $S_{10}$ where a halt instruction is issued. Finally, an instruction signal is applied to the REC/PAUSE input terminal of the mechanism control section 25 so as to render the tape recorder in a stand-by condition ($S_{13}$). The control operation may be terminated by omitting the operation $S_{13}$ and placing the tape recorder in the stop condition.

Figure 5:
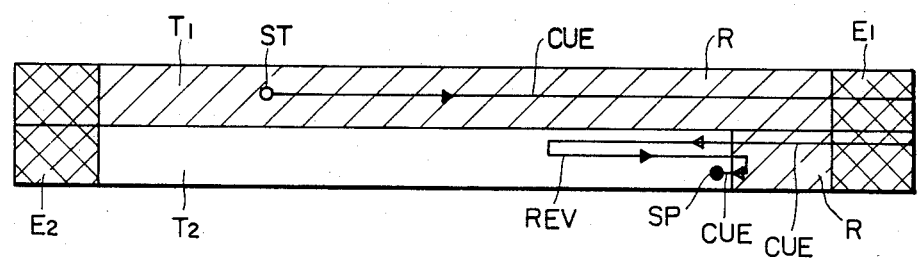
FIG. 5 is an explanatory diagram for describing the movement of magnetic tape relative to the head.

FIG. 5 is an explanatory diagram for describing the movement of the magnetic tape relative to the recording/playback head when the device according to the second embodiment is employed. In the following description, as before, the discussion proceeds as if the recording/playback head is moved relative to the magnetic tape. FIG. 5 shows the case where the entire region of the forward side track $T_1$ has already been recorded, and where a part of the reverse side track $T_2$ has also been recorded while the remainder is blank. In this situation, assuming that the recording/playback head is in the position ST on the forward side tract $T_1$, the recording/playback head is moved towards the tape end $E_1$ in accordance with the cue mode operation, because there are no non-recorded portions on the forward side track. Then, the operational mode is changed to the reverse directional mode and the head is moved so as to be in sliding contact with the reverse side track $T_2$. Next, in accordance with the cue mode operation, the recording/playback head is moved towards the tape $E_2$ along the track $T_2$. After passing the trailing edge of the recorded area R, the head is further moved in the same direction until the predetermined period of time has lapsed. After that, the head returns to the recorded portion via the review mode operation, and then is again moved by the cue mode operation to the position SP, where recording can be started.

As described above, according to the second embodiment of the invention, when a non-recorded or blank portion does not exist on the track of either the forward or reverse side when the recording start position setting operation is implemented, the operational mode direction is automatically changed and the recording start position is set on the opposite side track just ahead of any recorded region. Therefore, it is advantageous in that complicated manual operation is not required.

In the description relating to FIG. 4, although a tape deck employing a recording/playback head has been described as an example, it will be apparent, as previously, that the above principles and the control operation are equally applicable to a tape recorder where the recording and playback heads are provided separately, taking into consideration the distance between the recording and playback heads.

The particular circuit arrangements adapted for use in the block 7 shown in FIG. 1 and/or the block 22 shown in FIG. 3 will now be described with reference to FIGS. 6 and 7. FIG. 6 shows the arrangement of a signal detection circuit, known in the art as an inter-music detection circuit. In FIG. 6 an audio signal picked up by a playback head 31 is applied through an amplifier 32 to a voltage division circuit made up of resistors $R_1$ and $R_2$. The division voltage developed across the resistor $R_2$ is applied to the base of a switching transistor $Q_1$ which has an grounded emitter and a collector connected to resistors $R_3$ and $R_4$ and a capacitor $C_1$, all constituting a time constant circuit 33 together with transistor $Q_2$, $Q_3$ and resistors $R_5$ through $R_8$. When a fast forward (FF) mode signal is applied to the time constant circuit 33, the transistor $Q_2$ is rendered conductive, whereby a voltage $V_{cc}$ is developed across the resistor $R_3$. On the other hand, when a playback mode signal is applied to the time constant circuit 33, the transistor $Q_3$ is rendered conductive, whereby the voltage $V_{cc}$ is developed across the resistor $R_4$. The voltage across the capacitor C is applied to one terminal of a comparator 34, to the other terminal of which a reference voltage $V_{ref}$ is applied.

In the above-described circuit, since the transistor $Q_1$ carries out rapid ON/OFF operations in accordance with the nature of the audio signal picked up in the playback head 31, the voltage across the capacitor $C_1$ is approximately zero. In the non-recorded zone of the tape, the transistor $Q_1$ is rendered non-conductive and thus the capacitor $C_1$ is charged by the voltage $V_{cc}$ through either $R_3$ or $R_4$. When the voltage across the capacitor $C_1$ exceeds the reference voltage $V_{ref}$, the comparator 34 produces a high level signal representative of a non-recorded portion of the magnetic tape.

In the above-described circuit, the time constant is changed depending upon the tape operational mode so that a brief non-recorded segment interposed in recorded data or a low level signal of the recorded data is not detected as a blank portion. Specifically, in the playback mode, the resistance value of the resistor $R_3$ is selected so that the time constant becomes relatively large, whereas in the fast forward mode, the resistance value of the resistor $R_4$ is selected so that the time constant becomes relatively small.

FIG. 7 is a circuit diagram showing another example of the aforementioned blocks 7, 22 shown in Figs, 1 and 3. Like reference numerals or reference characters as used in FIG. 7 denote like elements or like components shown in FIG. 6. The time constant circuit 33' is made up of only the resistor $R_3$ and the capacitor $C_1$, and the voltage $V_{cc}$ is directly applied to the resistor $R_3$.

In the circuit thus arranged, the audio signal picked up by the playback head 31 is applied to the transistor $Q_1$ and the latter carries out rapid ON/OFF operations corresponding to the nature of the audio signal recorded on the tape. Therefore, the voltage across the capacitor $C_1$ is maintained approximately at zero, and the output of the comparator 34 is thus at the low level when the recorded data is present. In the tape zone where recorded data is not present, the transistor $Q_1$ is rendered non-conductive so that the capacitor $C_1$ is charged by the voltage $V_{cc}$ through the resistor $R_3$. When the voltage across the capacitor $C_1$ exceeds the reference voltage, then the comparator 34 outputs a high level detection signal representative of the recorded data.

It is to be noted that the time constant $C_1R_3$ is set for the FF mode. When the playback head 31 picks up a signal such as that shown in FIG. 8A in the FF mode, the output of the comparator 34 assumes the high level at the non-recorded zones interposed between the audio signals A(FIG. 8B). However, since the time constant has been set so small, in the playback mode, the capacitor $C_1$ is charged whenever relatively brief blank portions B as shown in FIG. 8C exist. As a result, the output of the comparator 34 assumes the high level.

What is claimed is:

1. A recording start position setting device for a tape recorder, comprising:

cue mode operation instruction means for instructing implementation of a cue mode operation for movement in a first direction of a tape in said tape recorder in response to a control start signal;

signal detection means for detecting from a playback head data recorded on a magnetic tape;

first means for instructing implementation of a review mode operation, said review mode operation causing movement in a second direction of said tape:

when said signal detection means fails to detect recorded data from the playback head for more than a first predetermined period of time during said cue mode operation;

second means for instructing implementation of a play mode operation for said first direction movement of said tape when said signal detection circuit detects recorded data from the playback head during the review mode operation, and for instructing the halting of the play mode operation when the play mode operation is implemented for more than a second predetermined period of time;

a tape end detection circuit for detecting a tape end and producing an end signal; and third means for instructing implementation of the review mode operation when the end signal is produced during the cue mode operation, said second means being enabled by the review mode implemented by said first means or said third means.

2. The device as claimed in claim 1, further comprising; a leader tape segment detection circuit for detecting a leader tape segment connected ahead of the magnetic tape and for producing a leader tape detection signal; and means for instructing implementation of said play mode operation or said cue mode operation when the leader tape detection signal is produced during said review mode opeation, and for halting the implemented operation when an output of said leader tape segment detection circuit indicates the presence of the magnetic tape.

* * * * *